United States Patent
Salgueiro et al.

(10) Patent No.: US 10,547,692 B2
(45) Date of Patent: Jan. 28, 2020

(54) ADDING CLOUD SERVICE PROVIDER, CLOUD SERVICE, AND CLOUD TENANT AWARENESS TO NETWORK SERVICE CHAINS

(71) Applicant: Cisco Technology, Inc., San Jose, CA (US)

(72) Inventors: Gonzalo Salgueiro, Raleigh, NC (US); Sebastian Jeuk, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 270 days.

(21) Appl. No.: 15/019,205

(22) Filed: Feb. 9, 2016

(65) Prior Publication Data

US 2017/0230467 A1    Aug. 10, 2017

(51) Int. Cl.
  *H04L 29/08*  (2006.01)
  *H04L 29/06*  (2006.01)
  *H04L 12/24*  (2006.01)
  *H04L 12/725*  (2013.01)

(52) U.S. Cl.
  CPC .......... *H04L 67/16* (2013.01); *H04L 41/0893* (2013.01); *H04L 45/306* (2013.01); *H04L 67/10* (2013.01); *H04L 67/28* (2013.01); *H04L 67/2814* (2013.01); *H04L 69/22* (2013.01)

(58) Field of Classification Search
  CPC ..... H04L 61/20; H04L 61/2514; H04L 45/22; H04L 45/306; H04L 67/16; H04L 67/2814; H04L 67/28; H04L 41/0893; H04L 69/22; H04L 67/10; H04L 67/18
  See application file for complete search history.

(56) References Cited

U.S. PATENT DOCUMENTS

| | | | |
|---|---|---|---|
| 9,444,675 B2* | 9/2016 | Guichard | ................ H04L 45/28 |
| 9,729,406 B2* | 8/2017 | Jeuk | ........................ H04L 61/20 |
| 9,979,645 B2* | 5/2018 | Li | ........................... H04L 45/745 |
| 10,243,922 B2* | 3/2019 | Bifulco | ................... H04L 45/64 |
| 2008/0177896 A1* | 7/2008 | Quinn | ................. H04L 67/2814 |
| | | | 709/238 |
| 2013/0103834 A1* | 4/2013 | Dzerve | ............... H04L 61/2514 |
| | | | 709/225 |
| 2014/0169215 A1 | 6/2014 | Rajendran et al. | |
| 2014/0307744 A1 | 10/2014 | Dunbar et al. | |
| 2014/0334295 A1 | 11/2014 | Guichard et al. | |
| 2014/0334488 A1* | 11/2014 | Guichard | .............. H04L 45/306 |
| | | | 370/392 |

(Continued)

FOREIGN PATENT DOCUMENTS

WO    2016/045710 A1    3/2016

OTHER PUBLICATIONS

Jeuk et al, "Universal Cloud Classification (USS) and its Evaluation in a Data Center Environment", Jun. 2014, 2014 IEEE 6th International Conference on Cloud Computing.*

(Continued)

*Primary Examiner* — Ramy M Osman
(74) *Attorney, Agent, or Firm* — Edell, Shapiro & Finnan, LLC

(57) ABSTRACT

A packet is received at a device configured to provide a service function within a network service chain. A cloud service identifier is extracted from a header of the packet. The service function is applied to the packet according to policies specific to a cloud service identified in the cloud service identifier.

19 Claims, 6 Drawing Sheets

(56) References Cited

U.S. PATENT DOCUMENTS

| | | | |
|---|---|---|---|
| 2014/0362682 A1* | 12/2014 | Guichard | H04L 41/5038 370/221 |
| 2015/0063102 A1 | 3/2015 | Mestery et al. | |
| 2015/0089082 A1 | 3/2015 | Patwardhan et al. | |
| 2015/0131484 A1* | 5/2015 | Aldrin | H04L 43/50 370/254 |
| 2015/0195197 A1 | 7/2015 | Yong et al. | |
| 2015/0319089 A1* | 11/2015 | Liu | H04L 45/745 370/392 |
| 2015/0326473 A1* | 11/2015 | Dunbar | H04L 12/4633 370/392 |
| 2015/0365322 A1* | 12/2015 | Shatzkamer | H04L 45/74 370/392 |
| 2016/0028640 A1* | 1/2016 | Zhang | H04L 45/306 370/389 |
| 2016/0050141 A1* | 2/2016 | Wu | H04L 45/22 370/389 |
| 2016/0065456 A1 | 3/2016 | Muley et al. | |
| 2016/0119226 A1* | 4/2016 | Guichard | H04L 45/38 370/392 |
| 2016/0134481 A1* | 5/2016 | Akiya | H04L 41/5058 709/224 |
| 2016/0164776 A1 | 6/2016 | Biancaniello | |
| 2016/0173373 A1* | 6/2016 | Guichard | H04L 45/74 370/392 |
| 2016/0248685 A1* | 8/2016 | Pignataro | H04L 67/327 |
| 2016/0308981 A1* | 10/2016 | Cortes Gomez | H04L 41/0826 |
| 2016/0323183 A1* | 11/2016 | Jeuk | H04L 61/20 |
| 2016/0373474 A1* | 12/2016 | Sood | H04L 63/1425 |
| 2017/0005920 A1 | 1/2017 | Previdi et al. | |
| 2017/0012865 A1* | 1/2017 | Nainar | H04L 45/64 |
| 2017/0048815 A1* | 2/2017 | Clarke | H04W 64/00 |
| 2017/0054639 A1* | 2/2017 | Zhou | H04L 45/745 |
| 2017/0078176 A1* | 3/2017 | Lakshmikantha | H04L 45/64 |
| 2017/0093658 A1* | 3/2017 | Ryan | H04L 69/22 |
| 2017/0094002 A1* | 3/2017 | Kumar | H04L 45/306 |
| 2017/0163531 A1 | 6/2017 | Kumar et al. | |
| 2017/0222917 A1* | 8/2017 | Reddy | H04L 45/24 |
| 2017/0230467 A1* | 8/2017 | Salgueiro | H04L 67/16 |
| 2017/0346704 A1* | 11/2017 | Strijkers | H04L 41/5054 |
| 2017/0373990 A1 | 12/2017 | Jeuk et al. | |
| 2018/0026893 A1* | 1/2018 | Jeuk | H04L 47/20 |
| 2018/0139231 A1* | 5/2018 | Roeland | H04L 63/1458 |

OTHER PUBLICATIONS

Jeuk et al, "A Novel Approach to Classify Cloud Entities: Universal Cloud Computing", Feb. 2015, 2015 15th IEEE/ACM International Symposium on Cluster, Cloud and Grid Computing.*

Baker et al., "A Model for IPv6 Operation in OpenStack", Internet Draft, Cisco Systems, Feb. 8, 2015, 38 pages.

Jeuk et al., "Universal Cloud Classification (UCC) and its Evaluation in a Data Center Environment", 2014 IEEE 6th International Conference on Cloud Computing Technology and Science, Dec. 15-Dec. 18, 2014, 6 pages.

Jeuk et al., "Towards Cloud, Service and Tenant Classification for Cloud Computing", 2014 14th IEEE/ACM International Symposium on Cluster, Cloud and Grid Computing, May 26-May 29, 2014, 10 pages.

Deering et al., "Internet Protocol, Version 6 (IPv6)", Cisco, Dec. 1998, 39 pages.

S. Jeuk, et al., "Tenant-ID: Tagging Tenant Assets in Cloud Environments", 2013 13th IEEE/ACM International Symposium on Cluster, Cloud, and Grid Computing, May 13-16, 2013, Delft, Netherlands, 6 pages.

S. Jeuk, et al., "A Novel Approach to Classify Cloud Entities: Universal Cloud Classification (UCC)", 2015 15th IEEE/ACM International Symposium on Cluster, Cloud and Grid Computing, May 4-7, 2015, Shenzhen, China, 4 pages.

S. Jeuk, et al., "Network Segmentation in the Cloud A Novel Architecture Based on UCC and IID", 2015 IEEE 4th International Conference on Cloud Networking (CloudNet), Oct. 5-7, 2015, Niagara Falls, ON, Canada, 6 pages.

S. Jeuk, et al., "Towards Cloud-Aware Policy Enforcement with Universal Cloud Classification as a Service (UCCaaS) in Software Defined Networks", 2016 IEEE 9th International Conference on Cloud Computing, Jun. 27-Jul. 2, 2016, San Franciso, CA, 8 pages.

\* cited by examiner

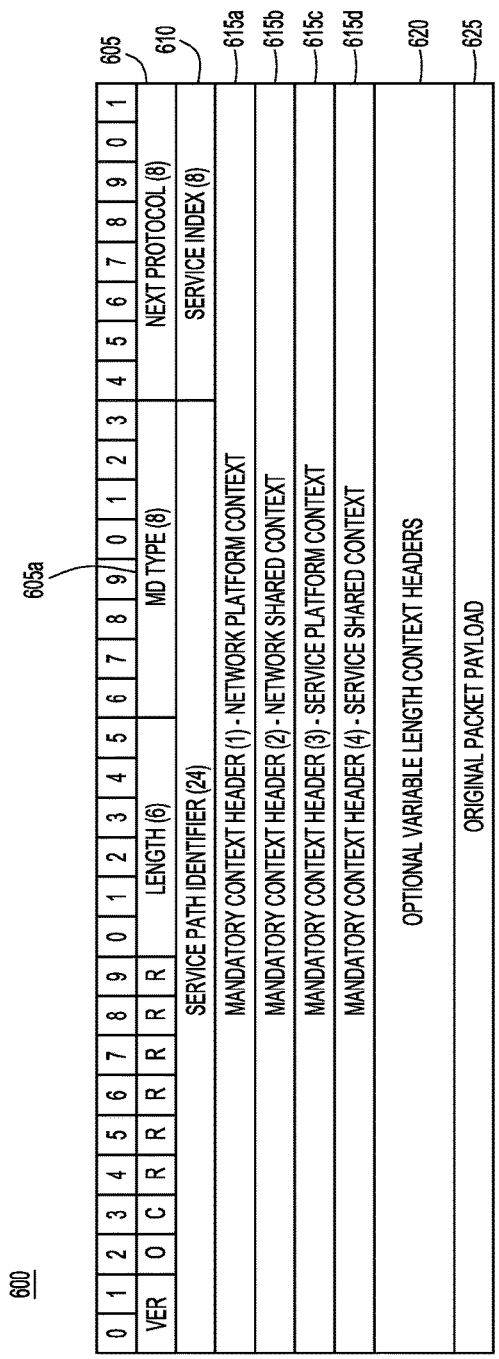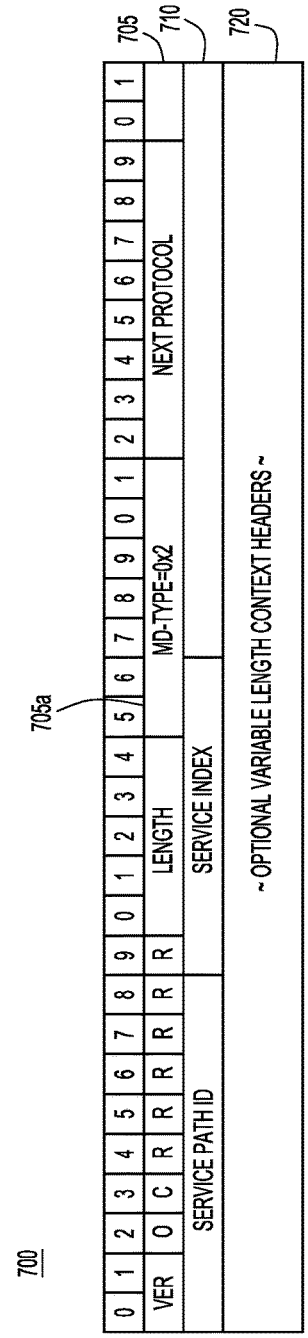
FIG.6
FIG.7

ADDING CLOUD SERVICE PROVIDER, CLOUD SERVICE, AND CLOUD TENANT AWARENESS TO NETWORK SERVICE CHAINS

TECHNICAL FIELD

The present disclosure relates to network service chains.

BACKGROUND

Network service chains are sequences of actions or service functions that are applied to packets of traffic as the packets pass through physical and/or virtual network elements. The service functions may be arranged according to pre-defined policies and then deployed using automated processes. A network service header is added to the packets of a data stream and describes a sequence of service nodes that the packet must be routed to prior to reaching the destination address. The network service header may also include metadata information about the packet and/or the service chain.

Entities in a cloud computing environment include cloud providers, cloud services supported by the cloud providers, and tenants or consumers that use the cloud services. While multi-tenancy (i.e., offering of services across many tenants within a cloud provider) is an important aspect of cloud computing, conventional techniques to identify the cloud computing entities do not allow classification and isolation on a per-cloud, per-service, and per-tenant basis at the network layer.

BRIEF DESCRIPTION OF THE DRAWINGS

FIG. 6 illustrates a first example header providing cloud service provider, cloud service and/or cloud tenant awareness, according to an example embodiment.

FIG. 7 illustrates a second example header providing cloud service provider, cloud service and/or cloud tenant awareness, according to an example embodiment.

DESCRIPTION OF EXAMPLE EMBODIMENTS

Overview

In one embodiment, a packet is received at a device configured to provide a service function within a network service chain. A cloud service identifier is extracted from a header of the packet. The service function is applied to the packet according to policies specific to a cloud service identified in the cloud service identifier.

Example Embodiments

Figure 1:
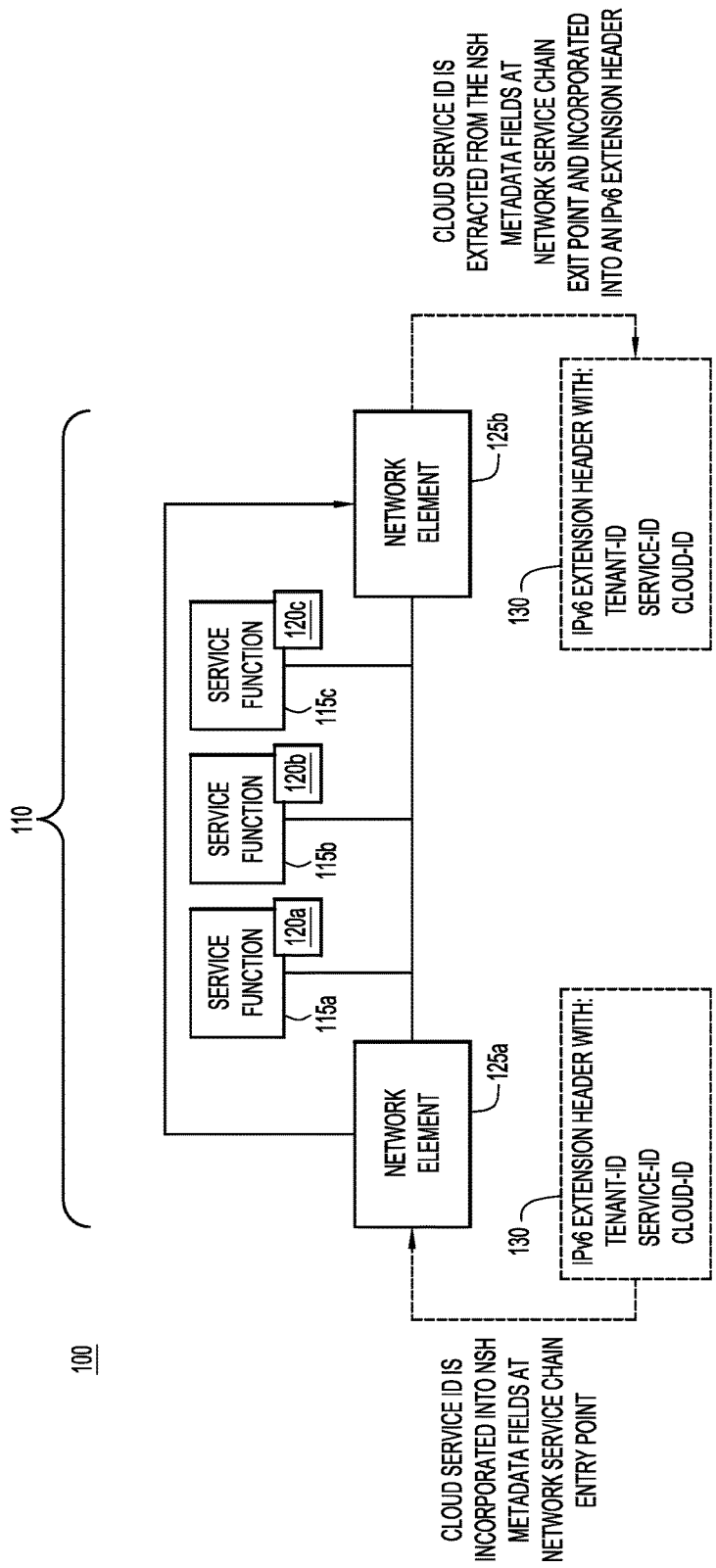
FIG. 1 is an illustration of a network service chain configured with cloud service provider, cloud service and/or cloud tenant awareness, according to an example embodiment.

With reference made to FIG. 1, depicted therein is a network environment 100 configured to provide cloud-service specific network services within a network service chain through the use of a cloud service identifier. Included within network environment 100 is network service chain 110. Service functions 115a-c within network service chain 110 provide network service functions to packets traversing network service chain 110. Network service functions 115a-c include services such as deep-packet inspection (DPI), firewall services, network address translation (NAT), and hypertext transfer protocol (HTTP) application functions, among other functions. As traffic travels through service functions 115a-c, the service functions augment or operate on the traffic.

The path through which the traffic traverses network service chain 110 may be determined by a network service header (NSH) applied to and encapsulating the traffic traversing network environment 100. Based on the content of the NSH, a packet will traverse network service chain 110, having network services applied by network service functions 115a-c. In conventional service chains, service functions 115a-c may be unaware of the cloud service, cloud provider and/or cloud tenant associated with a particular packet traversing service chain 110, as this information may not have been included in the NSH for the packets. Accordingly, network services functions 115a-c would be unable to apply network services based upon the cloud provider, cloud service or cloud tenant associated with any particular packet.

In the example embodiment of FIG. 1, network service functions 115a-c include cloud service identifier agents/units 120a-c, respectively. Each of cloud service identifier units 120a-c extracts a cloud service identifier from packets traversing network service chain 110, and causes the service function to be applied to the packet based, at least partially, on an identity derived from the cloud service identifier. The cloud service identifier may identify one or more of a cloud provider, a cloud service function, and/or a cloud tenant. Accordingly, the network service function applied to the packet may be based on one or more of the cloud provider, the cloud service function, and/or the cloud tenant. The cloud service identifier agents/units 120a-c may be embodied as software running in conjunction with the network service functions 115a-c, respectively.

In order for the network service identifier to be extracted by cloud service identifier agents/units 120a-c, network elements 125a and 125b may insert the cloud service identifier into the NSH of the packet when transmitting the packet into network service chain 110. For example, network element 125a receives or generates a packet to be transmitted into network service chain 100. In order for the packet to traverse network service chain 110, network element 125a will provide the packet with an NSH defining the path and services to be applied to the packet. As part of this process, network element 125a may determine a cloud service identifier for the packet, and include this cloud service identifier in the NSH for the packet. For example, network element 125a may be embodied as a classifier element for network service chain 110.

Classifier network element 125a will encapsulate each packet of a traffic flow with a NSH. The NSH includes data describing a service function path that the packet will travel within the network 100 in order to receive the appropriate service functions. The service function path determines which service functions will operate on the packet as well as the order in which the service functions will operate on the packet. Classifier network element 125a will also insert a cloud service identifier into the NSH, for example, into the metadata of the NSH, corresponding to one or more of the cloud provider, cloud service, or cloud tenant associated with the packet. The metadata may comprise a series of fixed length metadata headers (e.g., a Type 1 Network Service Header) or one or more variable length metadata headers (e.g., a Type 2 Network Service Header). The NSH may be encrypted to add a layer of protection and ensure that the location information is securely transported such that it cannot be altered or bypassed.

The cloud service identifier may be extracted from the packet by the classifier network element 125a from the data contained in the packet being encapsulated in the NSH. For example, the packet received by classifier network element 125a may include one or more fields that serve as a cloud service identifier. According to the example of FIG. 1, an Internet Protocol version 6 (IPv6) packet is received at classifier network element 125a. Classifier network element 125a extracts a cloud service identifier from an extension header from the IPv6 packet. Once extracted from the IPv6 extension header, the cloud service identifier will be included in the NSH in, for example, a metadata field of the NSH. Specific examples of metadata fields that include cloud service identifiers are described below with reference to FIGS. 6 and 7.

By including the cloud service identifier in a metadata field, service functions 115a-c may leverage these classifiers without being configured to evaluate a new or separate cloud service identifier field. Specifically, each of the service functions 115a-c is configured to be able to evaluate the content of the NSH metadata fields. By including the cloud service identifiers in the NSH metadata fields, service functions can utilize the cloud service identifier when determining how to apply services to the packet, and therefore, can apply services to the packet based on one or more of the cloud service provider, the cloud service and/or the cloud tenant.

Embodiments presented herein may implement the cloud service identifier according to a hierarchical classification scheme (also referred to as a "generic hierarchical identification scheme" and "Universal Cloud Classification (UCC)") that uses multiple identifiers (IDs) to identify cloud providers, their respective services, and tenants in an end-to-end connection between the tenants and services used thereby. The UCC IDs are embedded into IP packets and various databases accessible to tenants, cloud providers, and services. The UCC IDs may be distributed/transported within a given cloud provider, and also outside of the given cloud provider, e.g., to other cloud providers and cloud provider networks, tenants, and services, as necessary. Structurally, the UCC IDs are loosely based on a "Digital Object Identifier" (DOI) scheme that creates hierarchical sub-identifiers within each ID. The scheme includes three main UCC IDs including (i) a cloud-ID to identify a cloud provider, (ii) a service-ID to identify a service within a cloud provider, and (iii) a tenant-ID with cloud provider significance, meaning a tenant-ID registered with a given cloud provider. Examples of the three UCC IDs (referred to simply as "IDs") are illustrated in FIGS. 2-4.

Figure 2:
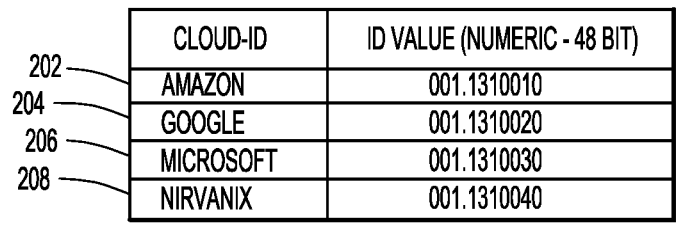
FIG. 2 illustrates examples of cloud service provider identifiers, according to an example embodiment.

With reference to FIG. 2, there is an illustration of four example cloud-IDs 202-208 to identify cloud providers. Each cloud-ID 202-208 has a name (e.g., "Amazon") and a value (e.g., 001.1310010) that is split into two sections. A first section (e.g., 001) identifies the registry location, and a second section (e.g., 1310010) provides a unique cloud provider ID/number in that region. The registry location indicated by the first section may be a geographical location, such as a country or state. The second section uniquely identifies a cloud provider within this region. This way, cloud-IDs 202-208 may be used to determine the origin of flows to and from a particular cloud provider. This is useful to allow/disallow flows depending on their origins to comply with certain legal requirements (i.e. data hosted in a data center located in America is not allowed to be accessed in Europe).

Figure 3:
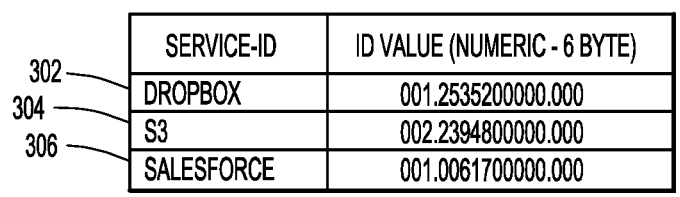
FIG. 3 illustrates examples of cloud service identifiers, according to an example embodiment.

With reference to FIG. 3, there is an illustration of three example service-IDs 302-306 that are used to identify services within a cloud provider. As used herein, cloud services refer to applications that are facilitated through the use of a cloud network and/or a cloud environment. Examples of cloud services include cloud-based storage, cloud-based processing, cloud-based e-mail, and cloud-based telephony and video conferencing, among others. Each of service-IDs 302-306 includes a name (e.g., Dropbox) and a value having 6-bytes for 3 sub-IDs that identify a data center of a cloud provider (e.g., the left-most field to the left of the left-most decimal point), a service in the data center (the center field between the decimal points), and an optional field (the right-most field).

Figure 4:
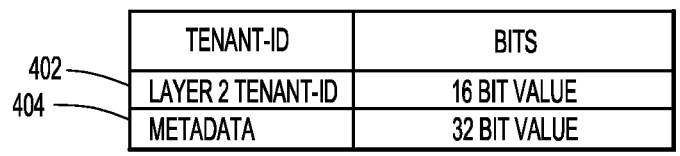
FIG. 4 illustrates examples of cloud tenant identifiers, according to an example embodiment.

With reference to FIG. 4, there is an illustration of two example tenant-IDs 402 and 404. Each tenant-ID includes a name and a value of 6 bytes to define a tenant-ID with cloud provider significance. Each tenant-ID identifies a consumer of a service, i.e., the tenant, of a cloud provider.

Figure 5:
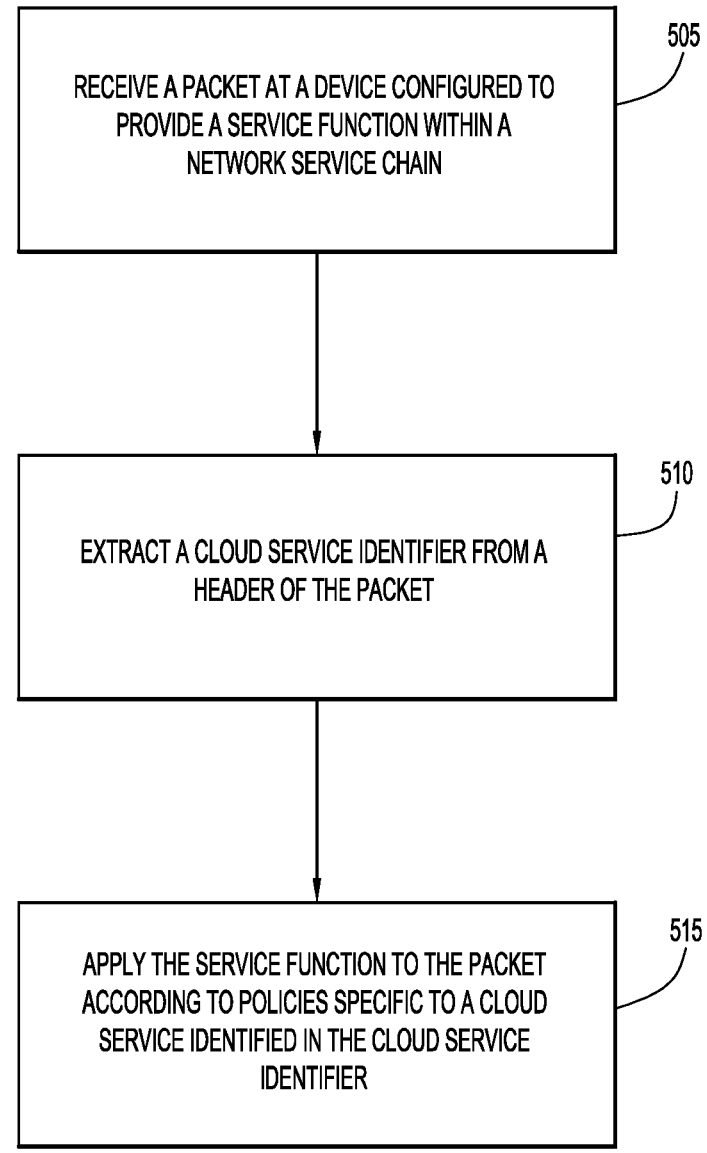
FIG. 5 is a flowchart illustrating a process for providing cloud service provider, cloud service and/or cloud tenant awareness, according to an example embodiment.

With reference now made to FIG. 5, depicted therein is a flowchart 500 illustrating a process for providing cloud service-specific network services within a network service chain. The process begins in operation 505 where a packet is received at a service function within a service chain. The service function is configured to provide cloud-service specific network services within a network service chain. The packet may include a cloud service identifier, as described above with reference to FIGS. 1-4, and/or has a structure as described below with reference to FIGS. 6 and 7.

In operation 510, a cloud service identifier is extracted from a header of the packet. The cloud service identifier may identify one or more of a cloud service provider, a cloud service, or a cloud service tenant associated with the packet. Furthermore, the cloud service identifier may also indicate the geographical location with which the cloud service provider and/or the cloud service tenant is associated. Operation 510 may also extract additional information from the header of the packet and/or the payload of the packet.

In operation 515, the service function is applied to the packet according to policies specific to a cloud service identified in the cloud service identifier. For example, as noted above, service functions may be applied differently based on a geographical location associated with the cloud service provider associated with a packet. Accordingly, packets originating from a cloud service registered outside of the United States may be blocked by a firewall cloud service. By extracting a cloud service identifier like that illustrated in FIG. 2, such a firewall service may be applied to packets. The network service may also be applied based on a combination of the cloud service identifier and other information that may be included in the header of the packet, such as in a metadata field of the packet. These values and the services applied based on them may include:

UCC Identifiers+IMEI Number—The International Mobile Station Equipment Identity (IMEI) Number is used to uniquely identify Global System for Mobile (GSM), Universal Mobile Telecommunications System (UMTS) and Long-Term Evolution (LTE) mobile phones. A mobile service provider running a private cloud can have multiple IMEIs per tenant (user). A user can leverage multiple services offered by the cloud. To define IMEI and tenant-specific policies within the network service chain, metadata identifying both the tenant and the IMEI number may be needed. Including the UCC Identifiers and the IMEI number (or numbers) in the metadata field of the NSH enables network service provisioning on a per-service/per-tenant and per-IMEI number basis.

UCC Identifiers+session identifier—Session Initiation Protocol (SIP) and/or ITU Telecommunication Standardization Sector (ITU-T) recommendation H.323 are protocols used to establish voice and/or video sessions between two endpoints. These protocols use identifiers to uniquely identify multimedia sessions, end-to-end. These identifiers can be carried in the NSH. A cloud provider hosting a cloud service providing voice/video applications can have multiple tenants. Each tenant (user) can establish multiple SIP/H.323 sessions at a given time. Including the UCC Identifier with the session identifiers allows for the application of policies per SIP/H.323 stream owned by a certain cloud tenant per network function in the network service chain.

UCC Identifiers+geographic location—Geographic location or "geolocation" is used to pinpoint the exact geographical location of an IP connected object such as a mobile phone. Geolocation information is useful in networks that apply policies based on geography. For example, certain traffic flows originating in Germany require the application of network services that reflect German laws. Other flows are more specific and local to the United States or the United Kingdom. Correlating the geolocation details to cloud-service and cloud-tenant identifiers allows location-specific policies to be applied within the network service chain on a per-service and/or per-tenant basis.

UCC Identifiers+SLA—Service Level Agreement (SLA) details are a critical component of service offerings in cloud environments. Cloud providers are keen to have the means to fulfill the offered SLAs on all levels of a cloud environment. With the insertion and correlation of cloud identifiers and SLA information into the NSH, service functions can define policies according to SLAs on a per-service/per-tenant basis.

UCC Identifiers+NAT—Network Address Translation (NAT) is an Open Systems Interconnection Mode Layer 3 network function that translates internal IP addresses to globally routable addresses. Applying NAT rules on a per-service/per-tenant basis is a key advantage for cloud providers and can be enabled by incorporating NAT details per cloud provider, cloud service, and cloud tenant.

UCC Identifiers+Routing—Defining forwarding decisions on a per-service/per-tenant basis is a novel approach of defining routing in a cloud environment. Incorporating forwarding information and the correlated cloud identities in the NSH enables service functions to forward traffic based on cloud entity requirements.

UCC Identifiers+Interface Identifier—The Interface Identifier (IID) is part of the IPv6 stack and is defined in Internet Engineering Task Force (IETF) Request for Comments (RFC) 4291. The IID is used to uniquely identify interfaces on a link, and the IID is typically incorporated into an IPv6 unicast address. Correlating the IID with cloud identifiers allow network services in a network function chain to apply policies per-service/per-tenant flow coming from a particular virtual machine (VM). This approach to defining network policies allows for the segmenting of VM traffic based upon the UCC and based upon the IIC.

UCC Identifiers+Storage Information—Correlating the cloud identifiers with storage information such as World Wide Names (WWNs) or World Wide Port Names (WWPNs) allows for the creation of network function chains with tenant/service specific storage policies.

UCC Identifiers+VPN—Virtual Private Networks (VPNs) typically require certain details to setup tunnel endpoints. Conveying VPN details in correlation with cloud identifiers allows network functions to setup VPN tunnels with service/tenant specific needs/characteristics.

UCC Identifiers+Security details—Correlating security (such as keys, encryption strength, etc.) and cloud identifier details allows network security functions to be specific to a cloud tenant, cloud service or cloud provider UCC Identifiers+Quality of Service (QoS) requirements—The NSH can be used to identify interesting flows and signal flow characteristics as a means of consistent treatment of traffic and maintaining user experience across domains. Correlating these flows with UCC identifiers provides cloud providers with the ability to offer differentiated treatment on a per-tenant and/or per-service basis.

With reference now made to FIG. 6, depicted therein is a first example NSH 600 that is configured to include cloud service identifier information. NSH 600 includes a 4-byte base header 605 and a 4-byte service path header 610. The base header 605 provides information about the service header 600 and the payload 620. Included in base header 605 is a metadata type field 605*a* that indicates the metadata type, among a plurality of types. The metadata type field 605*a* in the example of FIG. 6 is what is known as Type 1 metadata. This means that the NSH includes four mandatory 4-byte context headers 615*a-d*. NSH 600 also includes optional variable length context headers 620. Mandatory context headers 615*a-d* carry opaque metadata. The optional variable length context headers carry variable length type-length-value (TLV) formatted information. The service path header 610 provides path identification and location within a path information. Finally, NSH 600 encapsulates the original packet 625.

According to the techniques described herein, the cloud service identifier may be included in any one of the fixed context headers 615*a-d* and/or of the variable length context headers 620, depending on how the cloud service identifier will be used. For example, context header 615*a* provides network platform context metadata, i.e., platform specific metadata shared between network nodes. Context header 615*b* provides network shared context, i.e., metadata relevant to any network node. Context header 615*c* provides service platform context, i.e., service platform specific metadata shared between service functions. Context header 615*d* provides service shared context, i.e., metadata relevant to and shared between service functions. Optional variable length context header 620 includes TLV formatted metadata.

Depending on how the cloud service identifier is used, it may be contained in any one of these metadata fields.

By leveraging the metadata fields of NSH 600 to include a cloud service identifier in the NSH, network service chains can provide cloud service-, cloud provider- and cloud tenant-specific services even when the network elements and/or VMs are not configured to otherwise be aware of the cloud service, cloud provider or cloud tenant associated with a network packet. Specifically, every network service function of a network service chain is configured to access the metadata portions of NSH 600. By including the cloud service identifier in the metadata fields, network service functions may be applied according to cloud service, cloud tenant or cloud provider specific policies.

With reference now made to FIG. 700, depicted therein is another example NSH 700. NSH 700 also includes a base header 705 and a service path header 710. Where metadata type field 605*a* of FIG. 6 indicates that NSH 600 has type 1 metadata, metadata type field 705*a* of FIG. 7 indicates that NSH 700 includes Type 2 metadata. Accordingly, NSH 700 does not include fixed context headers, such as fixed context headers 615*a-d* of FIG. 6. Instead, NSH 700 only contains variable length context headers 720. Optional variable length context headers 720 include TLV formatted metadata. According to the techniques described herein, a cloud service identifier will be included in variable length context headers 720.

Figure 8:
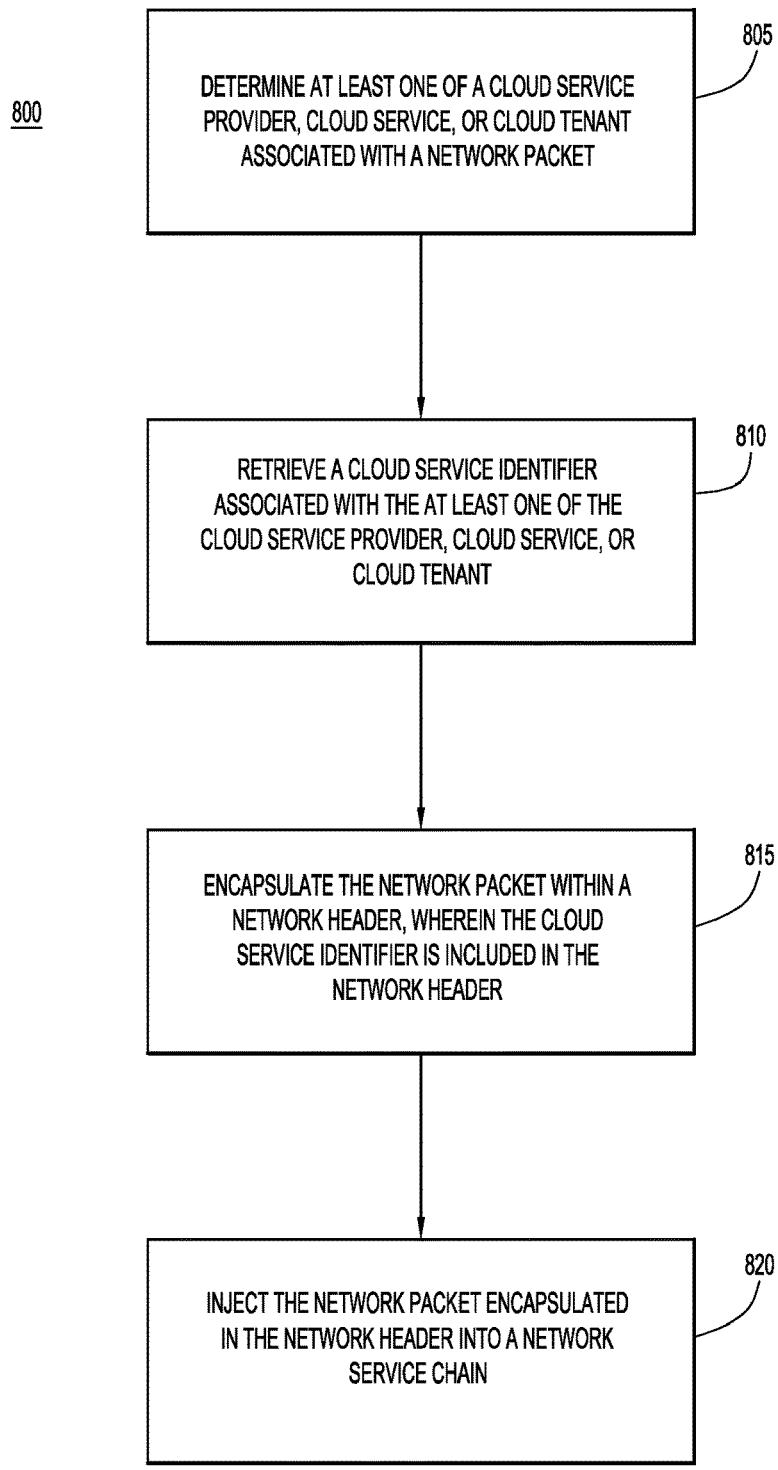
FIG. 8 is a flowchart illustrating a process for including a cloud service identifier in a header in order to provide cloud service provider, cloud service and/or cloud tenant awareness, according to an example embodiment.

With reference now made to FIG. 8, depicted therein is a flowchart 800 illustrating a process for inserting a cloud service identifier into an NSH, such as NSH 600 of FIG. 6 or NSH 700 of FIG. 7. The process begins in operation 805 where at least one of a cloud service provider, a cloud service, and/or a cloud tenant is determined as being associated with a network packet. This determination may be made by examining the contents of the network packet and/or querying a database containing information regarding cloud service providers, cloud services, and/or cloud tenants. In operation 810, a cloud service identifier associated with at least one of the cloud service provider, cloud service, or cloud tenant is retrieved. The cloud service identifier may be retrieved from the content of the network packet, such as from an IPv6 extension header, and/or retrieved from the database containing information regarding cloud service providers, cloud services, and/or cloud tenants. In operation 815, the network packet is encapsulated in a network header, and the network header includes the cloud service identifier. For example, the encapsulation of the network packet may include encapsulating the packet in a network header like NSH 600 of FIG. 6 or NSH 700 of FIG. 7. The cloud service identifier may be included in the metadata portions (i.e., context headers 615*a-d* and/or 620 of FIG. 6 and/or context header 720 of FIG. 7) of the NSH. The network header may also include one or more of additional pieces of information, including but not limited to the additional information described above. Finally, the encapsulated network packet is injected into a network service chain.

Figure 9:
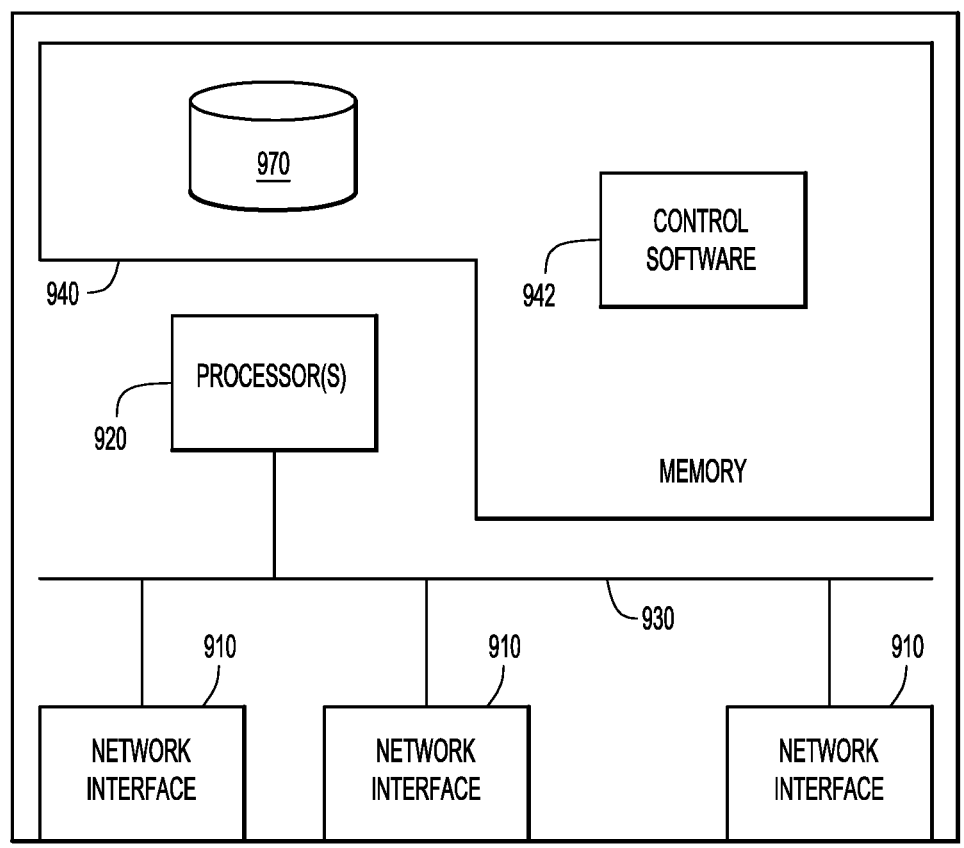
FIG. 9 is a block diagram of a device configured to provide cloud service provider, cloud service and/or cloud tenant awareness, according to an example embodiment.

With reference now made to FIG. 9, depicted therein is device 900. Device 900 may be a network device configured to perform the techniques described herein. Device 900 includes network interfaces (e.g., network ports) 910 which may be used to receive and send packets over a network. The network interfaces 910 be may be included as part of a network interface unit (e.g., a network interface card). Accordingly, network interfaces 910 may be embodied as wired interfaces, wireless interfaces, optical interfaces, electrical interfaces, or a combination thereof. One or more processors 920 are provided to coordinate and control device 900. The processor 920 is, for example, one or more microprocessors or microcontrollers, and it communicates with the network interfaces 910 via bus 930. Memory 940 stores software instructions for control software 942 which may be executed by the processor 920. For example, control software 942 for device 900 includes instructions for performing the techniques described above with reference to FIGS. 1-8. In other words, memory 940 includes instructions for device 900 to carry out the operations described above in connection with FIGS. 1-8. Specific instructions within memory 940 may cause device 900 to act as, for example, a cloud service identifier unit, such as cloud service identifier agents/units 120*a-c* of FIG. 1. Memory 940 may also store database 970 that serves as the database discussed above with reference to FIG. 8. This database may be stored in memory 940, and control software 942 may allow the processor 920 to access the data.

Memory 940 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 940 may be or include one or more tangible (non-transitory) computer readable storage media (e.g., a memory device) encoded with software comprising computer executable instructions. When the instructions of the control software 942 are executed (by the processor 920), the processor is operable to perform the operations described herein in connection with FIGS. 1-8.

In summary provided herein are methods, devices, and computer executable code that leverages cloud service identifiers, cloud service provider identifiers, and/or cloud tenant identifiers in the metadata field of a header to enable per-cloud, per-service and/or per-tenant service chaining and policy enforcement. The techniques described herein make use of the flexibility of the NSH metadata to employ intelligent data correlation utilizing cloud-based identifiers for a wide range of use-cases and applications. Additionally, transport of the cloud service identifiers in the metadata of the NSH allows service functions to leverage these classifiers without being cloud identifier-aware.

Specifically, described herein are methods that include receiving a packet at a network device configured to provide a service function within a network service chain. A cloud service identifier is extracted from a header of the packet. The service function is applied to the packet according to policies specific to a cloud service identified in the cloud service identifier.

In another form, an apparatus is provided that includes a processor and a network interface unit. The network interface unit is configured to enable network communications. The processor is configured to provide a service function within a network service chain. The processor is further configured to receive, via the network interface unit, a packet. The processor extracts a cloud service identifier from a header of the packet. The processor applies the service function to the packet according to policies specific to a cloud service identified in the cloud service identifier.

Additionally, described herein are one or more tangible, non-transitory computer readable storage media encoded with software comprising computer executable instructions. The software, when executed, is configured to receive a packet at a network device configured to provide a network service function within a network service chain. The instructions cause a cloud service identifier to be extracted from a header of the packet. The instructions further cause the network service function to be applied to the packet according to policies specific to a cloud service identified in the cloud service identifier.

By implementing the methods described herein, or through the use of devices as described herein, cloud entity awareness may be enabled in network service chains. While conventional classifiers use techniques to classify interesting traffic for network functions and related policies, the cloud service identifiers carried in the NSH allow classification and policing based on cloud providers, cloud services and cloud tenants. Cloud-specific identifiers can be used in conjunction with other information sets to granularly define policies at a tenant or service level. Additionally, transport of the cloud service identifiers in the metadata of the NSH allows service functions to leverage these classifiers without being cloud service identifier-aware.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   receiving a packet at a network device configured to provide a network service via a service function within a network service chain, wherein the network device is arranged within a network provided by a cloud service provider and configured to provide one or more cloud-based services for one or more cloud tenants;
   receiving the packet at the service function;
   extracting a cloud service identifier from a network service header of the packet, wherein the cloud service identifier identifies a cloud tenant;
   selecting, from a plurality of tenant specific policies, a policy associated with the cloud tenant identified in the cloud service identifier;
   applying the network service to the packet according to the policy associated with the cloud tenant identified in the cloud service identifier;
   updating the network service header in response to application of the network service to the packet; and
   transmitting the packet from the service function.

2. The method of claim 1, wherein extracting the cloud service identifier comprises extracting the cloud service identifier from a metadata field of the network service header.

3. The method of claim 2, wherein:
   extracting the cloud service identifier further comprises extracting from the metadata field metadata stored in the metadata field with the cloud service identifier; and
   applying the network service to the packet further comprises applying policies specific to the cloud service identifier and the metadata.

4. The method of claim 3, wherein the metadata comprises geographic location metadata, and wherein applying the network service to the packet further comprises applying policies based upon a geographic location from where the packet was received determined from the geographic location metadata.

5. The method of claim 3, wherein the metadata comprises service level agreement metadata, and wherein applying the network service to the packet further comprises applying policies that fulfill a service level agreement associated with the cloud tenant determined from the service level agreement metadata.

6. The method of claim 3, wherein the metadata comprises security detail metadata, and wherein applying the network service to the packet further comprises applying policies using an encryption key or an encryption strength determined from the security detail metadata.

7. The method of claim 3, wherein the metadata comprises quality of service metadata, and wherein applying the network service to the packet further comprises applying policies that maintain a quality of service determined from the quality of service metadata.

8. The method of claim 1, wherein the cloud service identifier comprises a Universal Cloud Classification.

9. The method of claim 1, further comprising:
   receiving a second packet at the service function;
   extracting a second cloud service identifier from a second network service header of the second packet, wherein the second cloud service identifier identifies a second cloud tenant; and
   applying the network service to the second packet according to second policies specific to the second cloud tenant.

10. An apparatus comprising:
    a network interface unit configured to enable network communications over a network, wherein the network is provided by a cloud service provider and configured to provide one or more cloud-based services for one or more cloud tenants; and
    a processor configured to provide a network service via a service function within a network service chain, wherein the processor is configured to:
    receive, via the network interface, a packet;
    receive the packet at the service function;
    extract a cloud service identifier from a network service header of the packet, wherein the cloud service identifier identifies a cloud tenant;
    select, from a plurality of tenant specific policies, a policy associated with the cloud tenant identified in the cloud service identifier;
    apply the network service to the packet according to the policy associated with the cloud tenant identified in the cloud service identifier;
    update the network service header in response to application of the network service to the packet; and
    transmit the packet from the service function.

11. The apparatus of claim 10, wherein the processor is configured to extract the cloud service identifier by extracting the cloud service identifier from a metadata field of the network service header.

12. The apparatus of claim 11, wherein the processor is configured to:
    extract metadata stored in the metadata field with the cloud service identifier; and
    apply the network service to the packet by applying policies specific to the cloud service identifier and the metadata.

13. The apparatus of claim 10, wherein the cloud service identifier is a Universal Cloud Classification.

14. The apparatus of claim 10, wherein the processor is further configured to:
    receive a second packet at the service function;
    extract a second cloud service identifier from a second network service header of the second packet, wherein the second cloud service identifier identifies a second cloud tenant; and
    apply the network service to the second packet according to second policies specific to the second cloud tenant.

15. One or more non-transitory computer readable storage media encoded with software comprising computer executable instructions and when the software is executed operable to:
- receive a packet at a network device configured to provide a network service via a service function within a network service chain, wherein the network device is arranged within a network provided by a cloud service provider and configured to provide one or more cloud-based services for one or more cloud tenants;
- receive the packet at the service function;
- extract a cloud service identifier from a network service header of the packet, wherein the cloud service identifier identifies a cloud tenant;
- select, from a plurality of tenant specific policies, a policy associated with the cloud tenant identified in the cloud service identifier;
- apply the network service to the packet according to the policy associated with the cloud tenant identified in the cloud service identifier;
- update the network service header in response to application of the network service to the packet; and
- transmit the packet from the service function.

16. The computer readable storage media of claim 15, wherein the instructions operable to extract the cloud service identifier are operable to extract the cloud service identifier from a metadata field of the network service header.

17. The computer readable storage media of claim 16, wherein:
- the instructions operable to extract the cloud service identifier are operable to extract from the metadata field metadata stored in the metadata field with the cloud service identifier; and
- the instructions operable to apply the network service to the packet are operable to apply policies specific to the cloud service identifier and the metadata.

18. The computer readable storage media of claim 15, wherein the cloud service identifier is a Universal Cloud Classification.

19. The computer readable storage media of claim 15, further comprising instructions operable to:
- receive a second packet at the service function;
- extract a second cloud service identifier from a second network service header of the second packet, wherein the cloud service identifier identifies a second cloud tenant; and
- apply the network service to the second packet according to second policies specific to the second cloud tenant.

\* \* \* \* \*